(12) United States Patent
Lee et al.

(10) Patent No.: US 6,591,966 B1
(45) Date of Patent: Jul. 15, 2003

(54) BAR CODE SCANNING METHOD FOR TIRE AND SCANNING EQUIPMENT THEREFOR

(75) Inventors: Ki Seong Lee, Choongchungnam-Do (KR); Ki Han Ko, Choongchungnam-Do (KR); Seung Wan An, Choongchungnam-Do (KR); Jong Hum Yeon, Choongchungnam-Do (KR)

(73) Assignee: Hankook Tire Co., Ltd., Seoul (KR)

( * ) Notice: Subject to any disclaimer, the term of this patent is extended or adjusted under 35 U.S.C. 154(b) by 0 days.

(21) Appl. No.: 09/453,945

(22) Filed: May 24, 2000

(30) Foreign Application Priority Data

Oct. 15, 1999 (KR) ............................................. 99-44711

(51) Int. Cl.7 .............................................. B65G 47/24
(52) U.S. Cl. ................... 198/415; 235/462.01; 198/373
(58) Field of Search .......................... 235/435, 462.01, 235/462.2, 384; 198/415

(56) References Cited

U.S. PATENT DOCUMENTS

| | | | | |
|---|---|---|---|---|
| 3,781,798 A | * | 12/1973 | Hinks | 340/146.3 |
| 3,930,141 A | * | 12/1975 | Koyama et al. | 235/61.11 |
| 4,019,627 A | * | 4/1977 | Eggert et al. | 198/786 |
| 4,638,756 A | * | 1/1987 | Collman | 118/215 |
| 4,700,078 A | * | 10/1987 | Mizuno et al. | 250/566 |
| 5,191,962 A | * | 3/1993 | Wegscheider et al. | 198/415 |
| 5,518,103 A | * | 5/1996 | Achelpohl et al. | 198/416 |
| 5,857,672 A | * | 1/1999 | Fowler et al. | 271/185 |
| 6,144,033 A | * | 11/2000 | Kokubu | 250/358.1 |

FOREIGN PATENT DOCUMENTS

JP  11035141 A  * 2/1999  ........... B65G/47/29

* cited by examiner

*Primary Examiner*—Karl D. Frech
*Assistant Examiner*—Daniel A. Hess
(74) *Attorney, Agent, or Firm*—Finnegan, Henderson, Farabow, Garrett & Dunner, L.L.P.

(57) ABSTRACT

A method for scanning a bar code printed on a tire and an equipment therefor are provided. The tire is moved in one direction, and the moving tire is sensed to stop at a predetermined position. Then, the tire stationed at the predetermined position is rotated to scan the bar code of the tire using a scanner fixed so as to scan only a part of the tire and then the tire is moved in one direction to be withdrawn from the predetermined position, thereby the bar code directly printed on the tire is accurately scanned.

2 Claims, 4 Drawing Sheets

BAR CODE SCANNING METHOD FOR TIRE AND SCANNING EQUIPMENT THEREFOR

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

DESCRIPTION OF RELATED ART

Since it is well known that tires are manufactured in various types and sizes, bar code labels are used for easy sorting of tires according to their types and sizes.

The bar code labels are printed in accordance with the information on tires such as type, size and the like. Thus the information on the pertinent tires such as tire type, size, price and so on can be easily identified by recognizing the bar code printed on the tire by means of a scanner.

According to the conventional technology, a bar code is printed on a label made of paper and then an operator manually affixes the label onto the tire. Since the label is white and the bar code is black, the bar code is easily identified. Thus, irrespective of the affixed position of a label, the bar code can be identified by scanning the entire tire by means of all omni-scanner capable of scanning multiple lines in various directions and wide areas.

However, in the case where the bar code is directly printed on the tire, that is to say if the bar code is printed in white printing solution on a side wall of the tire having a black background, using a white scanning solution, accuracy in scanning said bar code of conventional technology is less compared to that of a label type bar code. Thus, as with the conventional technology, scanning errors may occur frequently, when the bar code is scanned by the omni-scanner.

FIELD OF THE INVENTION

The present invention relates to a bar code scanning method for a tire and a scanning equipment therefor, and more particularly, to a bar code scanning method for accurately identifying the bar code printed directly on the tire, and a scanning equipment therefor.

SUMMARY OF THE INVENTION

To solve the above-described problems, it is an object of the present invention to provide a bar code scanning method for a tire, for accurately scanning a bar code, which is directly printed on the tire, and an equipment therefor.

To accomplish the above object of the present invention, there is provide a bar code scanning method for a tire, the method comprising the steps of moving the tire in one direction; sensing the moving tire and stopping the same at a predetermined position, rotating the tire stopped at the predetermined position and scanning the bar code of the tire by a scanner fixed so as to scan only a part of the tire; and moving the tire in one direction to withdraw the same from the predetermined position.

According to another aspect of the present invention, there is provided a bar code scanning equipment, comprising means for carrying or rotating a tire in one direction; means for sensing the supply of the tire by the tire rotating means; means for stopping the tire at a predetermined position; a bar code scanner for partially scanning the rotating tire stationed at the predetermined position, and a controller for automatically controlling the respective means step by step.

BRIEF DESCRIPTION OF THE DRAWINGS

The above object and advantages of the present invention will become more apparent by describing in detail a preferred embodiment thereof with reference to the accompanying drawings in which.

DESCRIPTION OF THE PREFERRED EMBODIMENTS

A preferred embodiment of the present invention will now be described in detail with reference to the accompanying drawings.

Figure 1:
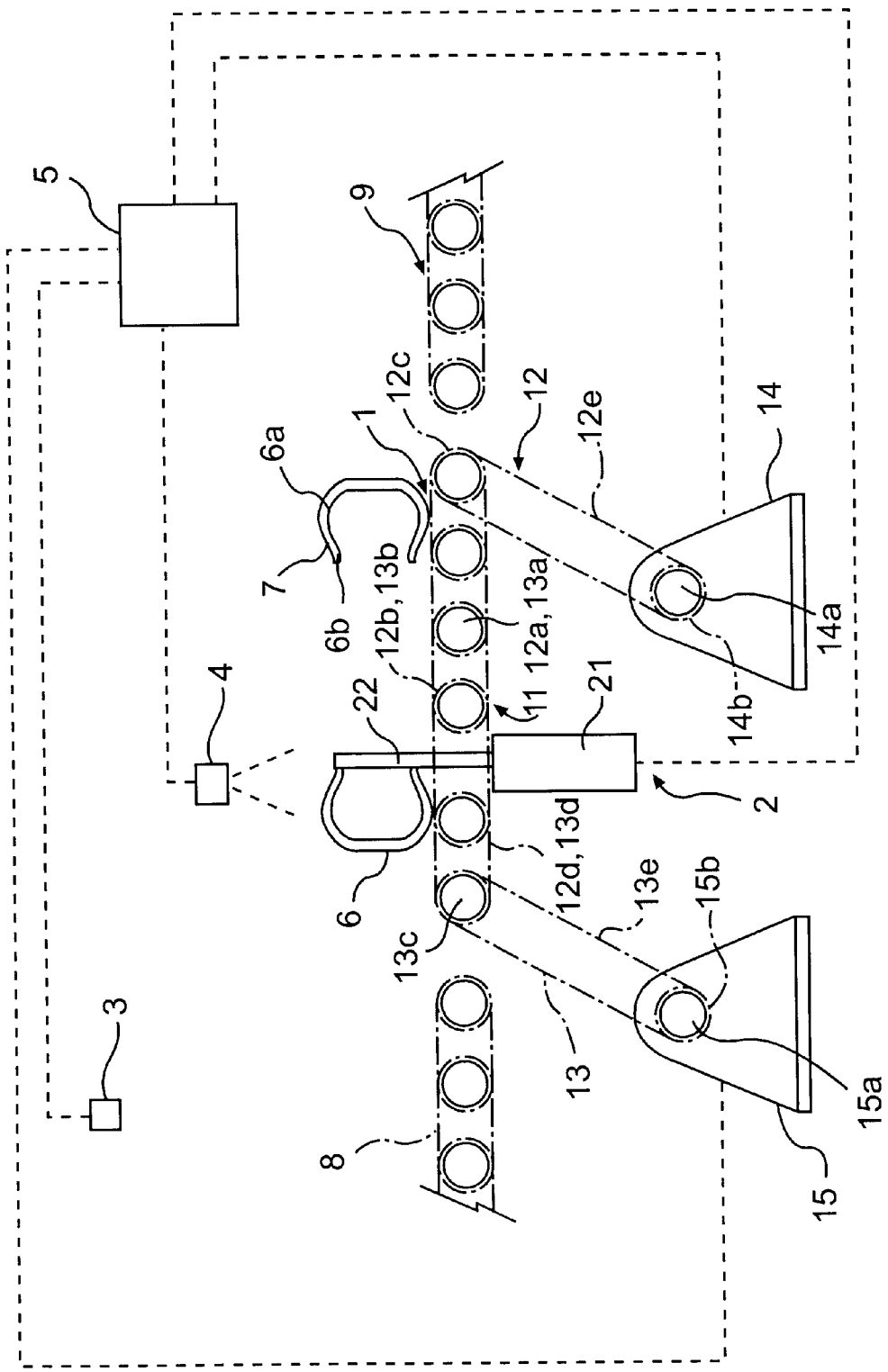
FIG. 1 is a front view schematically illustrating a bar code scanning equipment according to an embodiment of the present invention.
Figure 2:
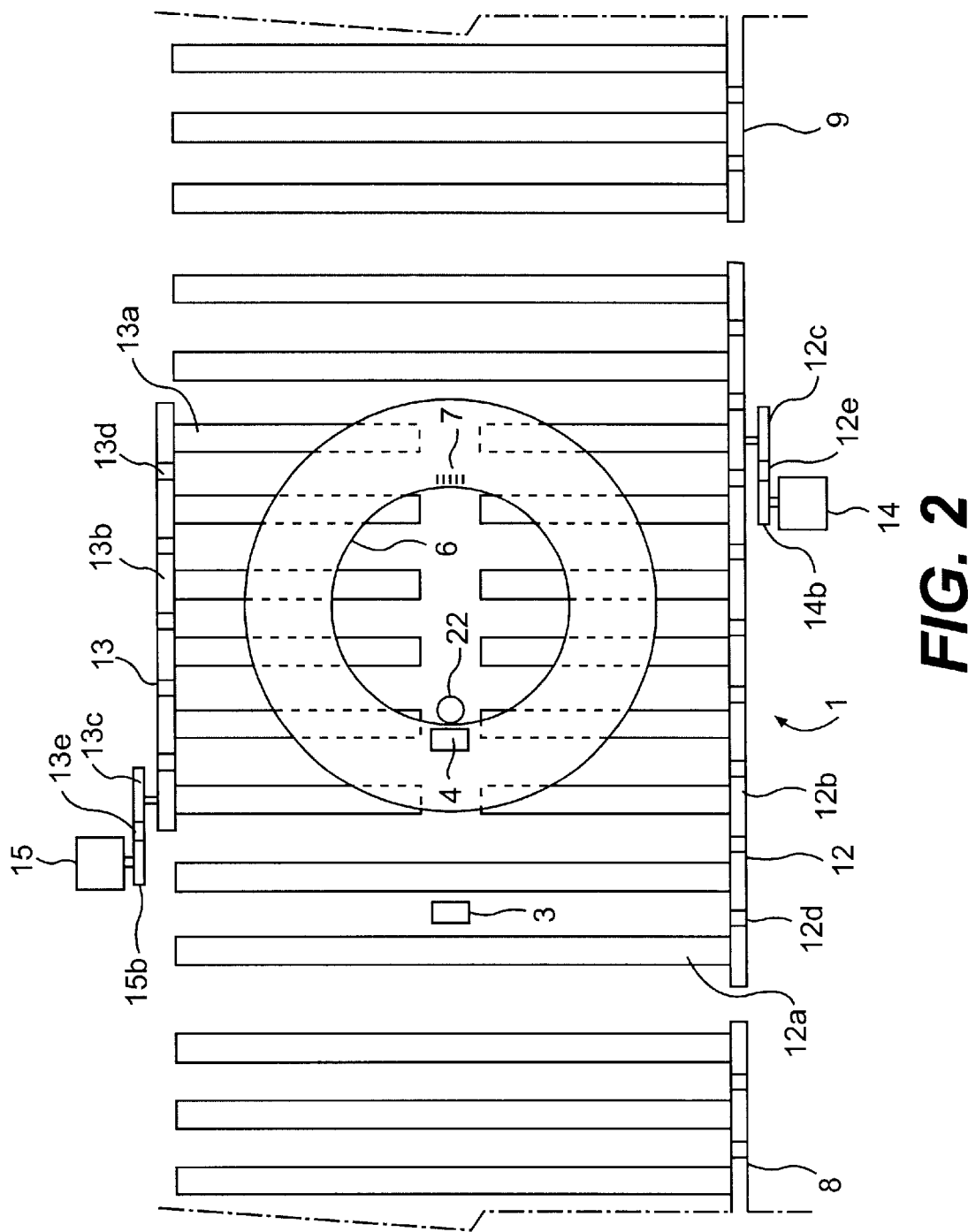
FIG. 2 is a plan view schematically illustrating the bar code scanning equipment shown in FIG. 1.

In Reference to FIGS. 1 and 2, a bar code scanning equipment of the present invention includes a tire rotator 1 for carrying or rotating a tire 6 in one direction, a tire sensor 3 for sensing the supply of the tire 6 by the tire rotator 1, a tire stopper 2 for stopping the tire 6 at a predetermined position, a scanner 4 for scanning a bar code 7 on the tire 6 stationed at the predetermined position, and a controller 5 for automatically controlling the respective elements 1, 2, 3 and 4 step by step.

In this embodiment, a 2-part roller conveyor 11 consisting of a first roller conveyor 12 and a second roller conveyor 13 operated by driving motors 14 and 15, respectively, is used as the tire rotator 1. The tire stopper 22 includes a pneumatic cylinder 21 operated by the controller 5 and a stopper 22 fixed on a piston rod of the pneumatic cylinder 21. The tire stopper 22 is operated by the controller 5 such that it comes to a halt while a bead 6b of the tire 6 is locked with the stopper 22 which protrudes between the rollers 12a and 13a of the 2-part roller conveyor 11.

The first and second roll conveyors 12 and 13 consist of a plurality of rollers 12a and 13a connected in a row by means of chains 12d and 13d equipped with chain gears 12b and 13b at one end, and driving motors 14 and 15 which equip with chain gears 14b and 15b at one end of motor shafts 14a and 15a are connected to arbitrary rollers 12a and 13a having a second chain gears 12c and 13c by means of chains 12e and 13. The driving motors 14 and 15 being operated by the controller 5.

The operation of the bar code scanning equipment will now be described in detail by sequential steps.

First, the power of the driving motor 14 of the first roller conveyor 12 is transferred sequentially from the motor shaft 14a to the chain gear 14b, the chain 13e, the chain gear 12c, the chain gear 12b, the chain gear 12d and then finally to the respective rollers 12a. Likewise, the power of the driving motor 15 of the second roll conveyor 13 is transferred sequentially from the motor shaft 15a to the chain gear 15b, the chain 13e, the chain gear 13c, the chain gear 13b, the chain gear 13d and then finally to the respective rollers 13a.

When the tire 6 supplied from a tire supply 8 is carried to a predetermined position where the scanning operation is performed, the roller 12a of the first roll conveyor 12 and tile roller 13a of the second roll conveyor 13 rotate in the same direction and at the same speed.

As described above, while the roller 12a of the first roll conveyor 12 and the roller 13a of the second roll conveyor 13 rotate in the same direction and at the same speed, and the tire 6 is supplied from the tire supply 8, the tire 6 on the rollers 12a and 13a of the 2 part roll conveyor 11 is transferred in the same direction of rotation of the rollers 12a and 13a.

Then, in the case where the supply of the tire 6 is sensed by the tire sensor 3, the pneumatic cylinder 21 is operated after a predetermined time elapses so that the piston rod of the pneumatic cylinder 21 extends. If the piston rod of the pneumatic cylinder 21 extends in such a manner, the stopper 22 fixed to the piston rod is then lifted between the rollers 12a and 13a to protrude inside the tire 6 that is being moved. In such a state, after a predetermined time elapses, that is to say, after the bead 6b of the tire 6 is locked with the stopper 22 so that the tire 6 is placed at the predetermined position, the driving motor 14 of the first roller conveyor 12 and the driving motor 15 of the second roller conveyor 13 come to a halt.

Subsequently, the scanner 4 installed in the vicinity of the tire 6 is driven to scan only a part of the tire 6 stationed at the predetermined position, while at the same time, the driving motor 14 of the first roll conveyor 12 is driven in a forward direction and the driving motor 15 of the second roller conveyor 13 is driven in a reverse direction so that the tire 6 rotates at the stopping position. Once the scanner 4 scans the bar code 7, the driving motors 14 and 15 of the first and second roll conveyors 12 and 13 come to a halt.

Thereafter, in the case where the driving motors 14 and 15 of the first and second roller conveyors 12 and 13 stop, the pneumatic cylinder 21 is operated in a reverse direction so that the stopper 22 is moved downward. Then, the driving motors 14 and 15 of the first and second roller conveyors 12 and 13 are both driven forward so that the tire 6 is discharged to a tire carrier 9.

In the operation of the above-described bar code scanning equipment, a method for scanning a bar code oil a tire according to the present invention includes the steps of moving the tire 6 in one direction sensing the moving tire 6 and stopping the tire 6 at a predetermined position; rotating the tire 6 stationed at the predetermined position and scanning the bar code 7 on the tire 6 by the scanner 4 fixed so as to be capable of scanning only a part of the tire 6; and moving the tire 6 in one direction to withdraw the same from the predetermined position.

Figure 3:
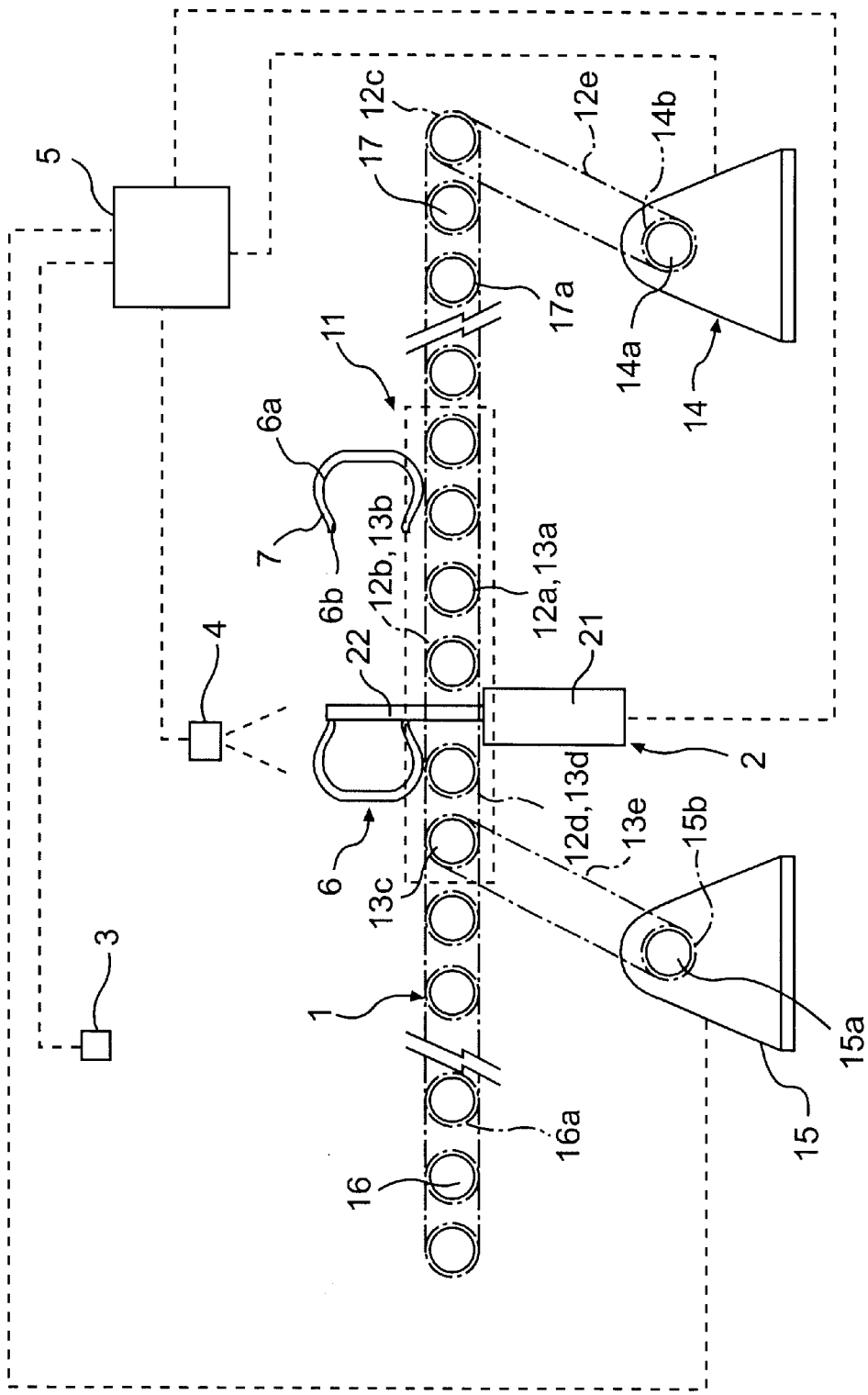
FIG. 3 is a front view schematically illustrating a bar code scanning equipment according to another embodiment of the present invention.
Figure 4:
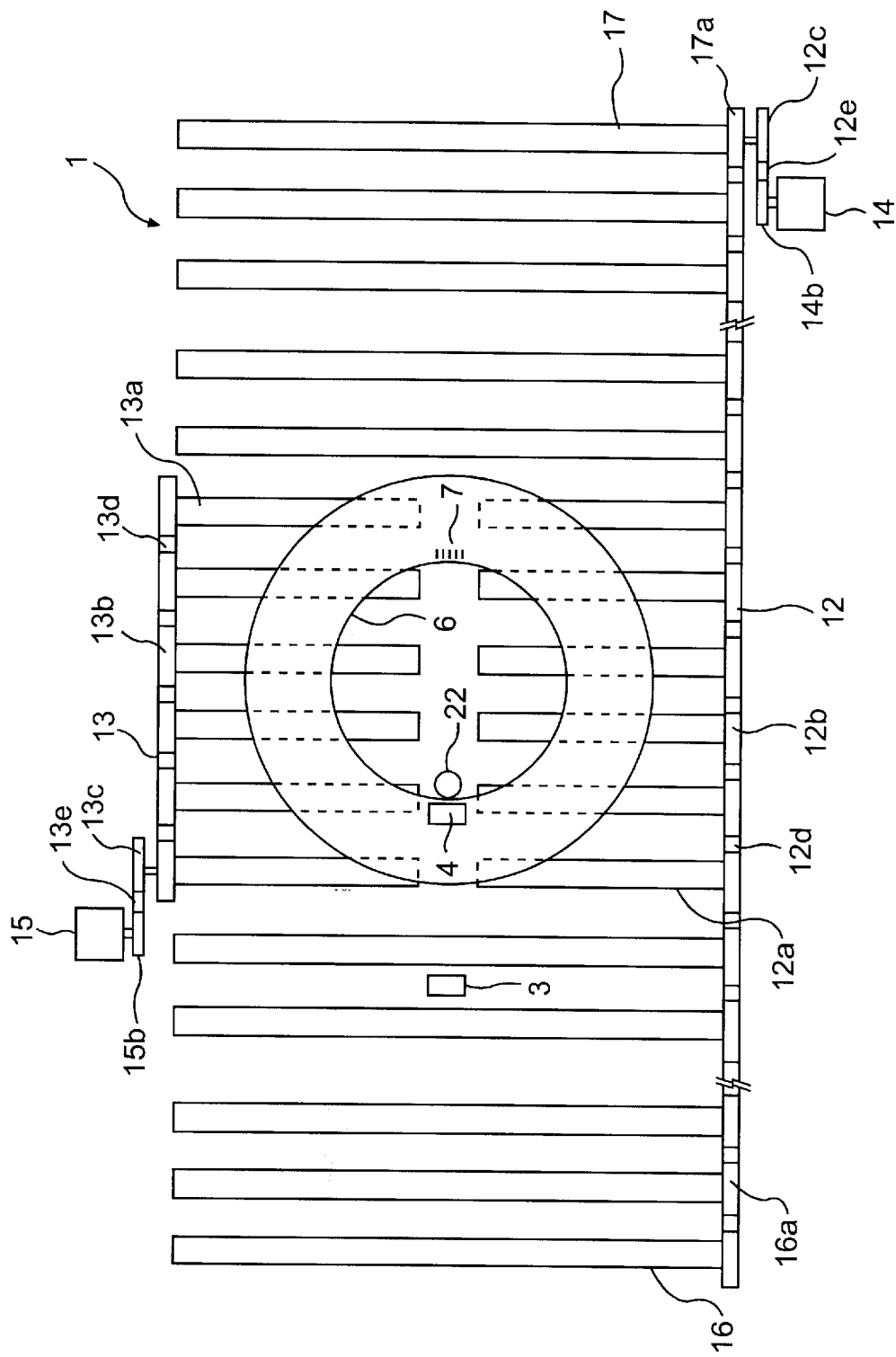
FIG. 4 is a plan view schematically illustrating the bar code scanning equipment shown in FIG. 3.

FIGS. 3 and 4 illustrate a modification of the bar code scanning equipment shown in FIGS. 1 and 2. As shown in the drawings, if necessary, reinforcement rollers 16 and 17, which are not split into two parts, may further be added to the first roller conveyor 12 of the 2-split roller conveyor 11. Here, the reinforcement rollers 16 and 17 may be driven by tile driving motor 14 of the first roller conveyor 12 to be connected to the roller 12a thereof.

As shown in FIGS. 3 and 4, generally, the reinforcement rollers 16 and 17 are linearly arranged in the front and rear parts of the first and second roller conveyors 12 and 13. However, as occasion demands, the reinforcement rollers 16 and 17 may be arranged between the rollers 12a and 13a of the first and second roll conveyors 12 and 13.

As described above, according to the present invention, even if the scanning capability may be lowered as a bar code is directly printed on a tire, problems caused due to scanning errors can be overcome, since the bar code of the rotating tire is locally scanned accurately by means of a scanner installed in the vicinity of the tire, in the case where the tire comes to a halt at a predetermined position.

Although the invention has been described with reference to a particular embodiment, it will be apparent to one of ordinary skill in the art that various changes and modifications can be made without departing from the spirit and scope of the invention as claimed hereinafter.

Deposit of Computer Program Listings

Not applicable

What is claimed is:

1. A bar code scanning apparatus for a tire, comprising:

means for carrying or rotating a tire in one direction including a two-part roller conveyor including a first roller conveyor and a second roller conveyor;

a pair of drive motors, one for driving each of said first and second roller conveyors to move the tire in one direction or rotate the tire at a predetermined position;

means for sensing the position of the tire supplied by said means for carrying or rotating;

means for stopping the tire at said predetermined position and including a pneumatic cylinder/piston device, and a stopper rod fixed on the piston of said device to halt movement of the tire by engagement with a bead of the tire, said stopper rod being movable to protrude between rollers of said two part roller conveyor;

a bar code scanner for partially scanning the tire while stopped and rotated at the predetermined position; and controller means for automatically and sequentially controlling said drive motors, said means for sensing, said means for stopping, and said scanner, wherein said means for carrying or rotating further comprises reinforcement rollers of a length approximating a combined width of said first and second roller conveyors, said reinforcement rollers being driven by said driving motor of said first roller conveyor or said driving motor of said second roller conveyor to be driven with said rollers of said two-part roller conveyor.

2. A bar code scanning apparatus for a tire, comprising:

means for carrying or rotating a tire in one direction including a two-part roller conveyor including a first roller conveyor and a second roller conveyor, said means for carrying or rotating a tire further including reinforcement rollers of a length approximating a combined width of said first and second roller conveyors;

a pair of drive motors, one for driving each of said first and second roller conveyors to move the tire in one direction or rotate the tire at a predetermined position;

means for sensing the position of the tire supplied by said means for carrying or rotating;

means for stopping the tire at said predetermined position and including a pneumatic cylinder/piston device, and a stopper rod fixed on the piston of said device to halt movement of the tire by engagement with a bead of the tire, said stopper rod being movable to protrude between rollers of said two part roller conveyor;

a bar code scanner for partially scanning the tire while stopped and rotated at the predetermined position; and controller means for automatically and sequentially controlling said drive motors, said means for sensing, said means for stopping, and said scanner.

* * * * *